(12) United States Patent
Jaubert (10) Patent No.: US 7,243,438 B2
(45) Date of Patent: Jul. 17, 2007

(54) TEMPLATE FOR CHECKING THE GEOMETRY OF SHAPED AND/OR BENT PROFILES

(75) Inventor: Philippe Jaubert, Cologne (FR)

(73) Assignee: JaubJaub Consulting, Cologne (FR)

( * ) Notice: Subject to any disclaimer, the term of this patent is extended or adjusted under 35 U.S.C. 154(b) by 0 days.

(21) Appl. No.: 10/570,101

(22) PCT Filed: Sep. 3, 2004

(86) PCT No.: PCT/FR2004/002247

§ 371 (c)(1),
(2), (4) Date: Mar. 1, 2006

(87) PCT Pub. No.: WO2005/024340

PCT Pub. Date: Mar. 17, 2005

(65) Prior Publication Data

US 2007/0011891 A1    Jan. 18, 2007

(30) Foreign Application Priority Data

Sep. 4, 2003    (FR) .................................. 03 10446

(51) Int. Cl.
*G01B 5/20* (2006.01)
(52) U.S. Cl. ........................... 33/551; 33/529; 269/311
(58) Field of Classification Search .................. 33/1 G, 33/529, 533, 545, 549, 551, 552, 553, 555, 33/562, 567, 573, 600; 269/9, 37, 40, 55, 269/56, 57, 58, 59, 71, 309, 311
See application file for complete search history.

(56) References Cited

U.S. PATENT DOCUMENTS

| 2,713,725 | A | * | 7/1955 | Goldsmith | .................... 33/552 |
| 3,203,100 | A | * | 8/1965 | Hegedus | ....................... 33/534 |
| 4,184,669 | A | * | 1/1980 | Bald | ........................... 269/309 |
| 4,593,476 | A | * | 6/1986 | Clark et al. | .................... 33/529 |
| 5,026,033 | A | * | 6/1991 | Roxy | ........................... 269/45 |
| 5,040,716 | A | * | 8/1991 | Stetz | ......................... 228/49.3 |
| 5,106,290 | A | | 4/1992 | Carver et al. | |
| 5,107,599 | A | * | 4/1992 | Marincic et al. | .............. 33/573 |
| 5,208,995 | A | | 5/1993 | McKendrick | |
| 5,412,877 | A | | 5/1995 | McKendrick | |
| 5,732,455 | A | * | 3/1998 | Diede | ........................ 29/281.5 |
| 6,029,333 | A | | 2/2000 | Saplenza, IV | |
| 6,145,212 | A | | 11/2000 | Geise et al. | |
| 7,103,985 | B1 | * | 9/2006 | Phillips et al. | ................. 33/562 |

FOREIGN PATENT DOCUMENTS

FR  2 837 277      9/2003
JP  58068601 A  *  4/1983

\* cited by examiner

*Primary Examiner*—R. Alexander Smith
(74) *Attorney, Agent, or Firm*—Egbert Law Offices (57) ABSTRACT

The invention relates to a template for checking the geometry of shaped and/or bent profiles (T) having rectilinear sections and bent sections. This template comprises a support plate (2), in which holes (8-10) are provided, and a superstructure comprised of, for each rectilinear section of the profile, a bracket (12) and at least one reinforcement (24) consisting of planar plates provided with lugs (16, 17, 29, 30) adapted for being inserted into the holes (8-10) of the support plate (2) and of assembling means (20, 30) that permit said bracket and reinforcement to be fit together in a position in which they extend perpendicularly. In addition, each bracket (12) is provided with at least one guiding element (45, 46) of the rectilinear section of the profile (T).

14 Claims, 6 Drawing Sheets

TEMPLATE FOR CHECKING THE GEOMETRY OF SHAPED AND/OR BENT PROFILES

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention concerns a gauge device for controlling the geometry of shaped and/or bent profiles and in particular bent tubes.

BACKGROUND OF THE INVENTION

In a number of industries, in particular automotive and aeronautical, a large number of profiles such as tubes are shaped then curved or bent.

These profiles are cut lengthwise, then possibly shaped at the ends and fitted with various components such as nuts, mountings, skirts, etc., and are curved or bent in space depending on precise dimensional features.

At the end of the profile production process, a geometric control of the latter is carried out.

A first method to determine if a shaped or bent profile complies with the required geometric tolerances, consists of using a multi-jointed measuring arm, specialized in measuring bent profiles. This method, which provides numerical measurement results, presents the disadvantage of being a very lengthy method of control and furthermore requires the acquisition of a costly measuring device and the training of skilled operators.

A second method to determine if a shaped and/or bent profile complies with the required geometric tolerances, consists of using a measuring gauge.

This gauge is made of a mechanical assembly presenting an enlarged and partial imprint of the profile fitted with its components and accessories. This imprint is made by means of a series of grooves made in the mechanical assembly, of dimensions corresponding to the profile section added to the positioning tolerance of the profile. The gauge is also designed to allow the profile to be inserted into the grooves of the gauge as well as to be extracted after being controlled.

Such a gauge allows for a quick comparison of the profile to be checked with the shape and circuit defined by the geometry of the gauge. If the profile to be checked can be inserted into the grooves of the gauge naturally, without deforming the said profile, then the latter is considered as complying with the geometric requirements.

Usually, current gauges are made up of a series of aluminum or wooden blocks fixed securely onto a hard, thick plate which is generally made of the same material as the blocks. Furthermore, in these blocks are grooves, often made by machining, or marks with pins added on all or a part of the length of the circuit corresponding to the image of the circuit of the profile to check. The grooves generally have the same height and width measurements as the profile added to the value of the positioning tolerance of the said profile at the level of this groove.

Another way of making these gauges is by welding metal structures together onto a base plate. Parts called guides are machined or fixed, possibly by welding, onto these structures to form grooved parts into which are inserted the profile to check.

The methods of control which consist in using such measuring gauges are all perfectly well-known and mastered by the men skilled in the art, and have the advantage of allowing profiles such as tubes to be checked very quickly.

However, gauges used for the implementation of these controlling methods happen to be very bulky and need large storage areas since, furthermore, they cannot be dismantled and cannot be stacked on top of each other.

Moreover the production processes for these gauges are costly because they are difficult to industrialize and generally need mass machining.

In order to compensate for the latter disadvantage, the U.S. Pat. No. 6,029,333 describes a production process specific to controlling gauge devices consisting of using a single piece of sheet metal held in position by tenons and slots on a base plate, and defines a production process for the gauges by means of CAD and a plate cutting machine.

Although such a production process effectively results in a reduction in production costs as compared to classic production processes, it nonetheless presents, in return, several major disadvantages.

Indeed, firstly in accordance with this process, the achievement of good control gauge assembly accuracy supposes perfect and accurate bending of the sheet. But such bending happens to be very difficult or even impossible to do automatically, and is, in practice, the cause of bending errors, which, if they do not prevent the sheet being mounted onto the plate, result in a deformation of the sheet. In particular, in its upper part which is used to check the profile, the consequence is a perceptible modification of the definition of the circuit of the profile and an impossibility to guarantee gauge assembly accuracy.

Moreover the differential lengthening of the material in the bends generates variations in the unbent part length that could prevent the sheet from being correctly assembled on the base plate, in particular when the profiles to be controlled have numerous bends separated by very short straight parts, such as the rear wheel brake tubing on automobiles. These differential lengthenings of the sheet can lead to it being impossible to assemble the sheet on the base plate and consequently impossible to make the control gauge.

Furthermore, certain profile geometries can lead to making wholly linear shaped sheets that need to be fixed very solidly and permanently on the base plate, in order to ensure that the whole length of the sheets will remain stable and not deform.

Finally, in the case of certain more complex shaped profiles, such as tubing currently found in the automotive industry, this manufacturing process of successively bending a sheet could prove to be impossible to implement due to the general bulkiness by the bending tools.

To sum up, the process of making a gauge as described above can not guarantee respect for tolerances in every profile configuration, is not easy to implement, and offers no solutions for easy assembling and dismantling of the gauge whilst at the same time retaining the tolerance characteristics of it. Moreover, even in the case of dismantling the bent sheet in relation to the base plate, the storage of the gauge proves to be quite difficult, its irregular geometry means that its storage is not free from risk of deformation of the bends.

The U.S. Pat. No. 5,412,877 describes, with reference to FIGS. 23 to 27, another manufacturing process specific to control gauges which consists of making all the components from parts cut out by a laser machine, and of assembling these components by means of a large number of tenons and slots secured by gluing.

Firstly, and in order to provide good rigidity to the gauges, this method of production has the drawback of needing a large number of parts machined as well as a relatively long assembly time for them.

Furthermore the design of the gauge and the way the tenons and slots are fixed on by glue makes the gauge impossible to dismantle. If dismantling were envisaged, it would entail, in fact, a very long and meticulous assembly operation imposing, to prevent any assembly imperfections, a control operation using a three dimensional measuring machine. In addition, a tenon incorrectly driven into one of the slots and its subsequent gluing is always possible, resulting in making a gauge inappropriate to the purpose for which it is destined. In fact, based on the design described, no layout can guarantee that the different parts making up the gauge are stuck together and are consequently positioned correctly.

In practical terms, and in view of the drawbacks aforementioned, it happens that the two above-mentioned methods described in the U.S. Pat. No. 6,029,333 and 5,412,877, with reference to the FIGS. 23 to 30, are almost never implemented in industry, in particular the automotive and aeronautical sectors. In fact it happens that one of the current methods commonly used in the automotive and aeronautical sectors, derives from the method illustrated in the FIGS. 1 to 22 of the U.S. Pat. No. 5,412,877. Nevertheless, marking the trajectories by a laser machine is only used on wooden gauges since as indicated in this patent, this product carbonizes and the marking leaves a deep black visible mark.

The origin of the present invention noticed that current gauges are both heavy and difficult to handle, costly and difficult to make, and difficult to dismantle and re-assemble without damaging the dimensional characteristics of the gauge. Characteristics define the trajectory of the tube to control and for which any deterioration is consequently unacceptable for a control gauge. The objective of the invention is thus to remedy all of these drawbacks.

BRIEF SUMMARY OF THE INVENTION

In this respect, the invention concerns a gauge device for controlling the geometry of shaped and/or bent profiles (T) having straight and bent sections, the control gauge being made up of a base consisting of a plate, called support plate, which has holes in it, and a superstructure defining an imprint of the profile (T) to control and having tenons adapted each to adjust and to be fitted into a hole in the support plate.

According to the invention, the base and the superstructure for this gauge are characterized in that:
the support plate comprises, firstly, holes extending in the direction of lines (xi) parallel to the orthogonal projections of each straight section of the profile (T), and secondly, for each of these straight sections, at least one hole extending in the direction of at least one line (yi) perpendicular to the orthogonal projection (xi) of the said straight section;
the superstructure comprises, for each straight section of the profile (T);
a support made up of a flat plate including, for each hole provided in the support plate in the direction of a line (xi) parallel to the orthogonal projection of the straight section, an extension consisting of a tenon adapted to adjust and to be fitted in the said hole, the said support being fitted, on the upper section, with at least one guiding device of said straight section;
at least one brace made up of a flat plate including, for each hole provided in the support plate in the direction of a line (yi) perpendicular to the orthogonal projection (xi) of the straight section, an extension consisting of a tenon adapted to adjust and to be fitted in the said hole;
the support and each of the said braces each comprising a notch forming a vertical slot made to respectively extend from the bottom part of the support and the upper part of the brace, these said vertical slots being positioned so as to obtain a mutual fitting of each of the elements, support and brace, in the vertical slot of the other element, fitted into place so that the support and the brace extend perpendicularly; and
each tenon formed in the extension of the support and of the brace being longer than the thickness of the support plate adapted to jut out underneath the latter, and comprising a shape of notch fit to ensure a rigid positioning without any play of the supports and the braces on the support plate.

It should be noted, as clarification, that the gauge according to the invention is claimed and described herein in its normal position of use in view of a control of the geometry of a profile, the support plate extending horizontally and the support and braces extending perpendicularly in relation to this support plate, i.e.: vertically. Consequently, the terms vertical, horizontal, upper, bottom, etc., are used in reference to such positioning.

According to the invention, the gauge is divided up into several section units each dedicated to guiding a single straight profile section, and consisting of, besides the guiding device, two single flat plates obtained by cutting out, a support and a brace, whose accuracy of positioning is assured thanks to, firstly, rigid fixing of the tenons in the slots, and secondly, the mutual fitting of each support with each associated brace.

This gauge is thus made up of flat parts obtained by a single cutting out operation, and hence not requiring any bending operation, etc., of which fixture on the support plate is, moreover, obtained by fittings and does not require any other complex assembly operation such as gluing, accurate assembly, etc.

The simplicity of this design eliminates all potential errors linked to current gauge production operations, such as sticking and bending, etc.

In an advantageous embodiment according to the invention, each support and brace tenon includes a notch shape which is adapted to define housing for detachable fixing means such as pins or wedges which are possibly elastic in nature.

According to this embodiment, the notches made in the tenons, which can take a variety of shapes, allow the insertion of the detachable fixing elements that ensure that the supports and braces are held in position on the support plate. These fixing elements allow, combined with the fitting systems designed in accordance with this invention, a dismantling and a re-assembly of the elements forming the gauge, and thus permit the storage of this gauge in its dismantled state.

In an other advantageous embodiment according to the invention, allowing dismantling and re-assembly of the gauge, each support and brace tenon includes a notch shape formed from two tabs, at least one of which is a clip tab, able to be locked into the underside of the support plate, and flexible enough so that they can move from an apart natural locking position to a close unlocking position.

Furthermore, advantageously, according to the invention, the guiding devices fitted to the supports comprise a bottom groove able to fit on top of the said supports without any play.

This bottom groove allows precise positioning of the guiding devices on the supports. In addition, the guiding devices can be manufactured in a bar of material machined on its whole length and then cut lengthways to be mounted on each support. This procedure results in an advantageous production cost.

Another way of manufacturing can consist of making the guiding devices by cutting out from one sheet which can also be used to cut out the supports and the braces.

In an another advantageous embodiment according to the invention, the guiding devices fitted to the supports include at least one upper imprint of a shape adapted to house the straight section of the profile (T), the said imprint being centered on the vertical plane of the support or centered on a vertical plane moved laterally in relation to the said vertical plane of the support.

So, such guiding devices include a control imprint into which the straight section of the profile must fit to be considered as acceptable. In general, this imprint presents the dimensions of the profile to which controlling tolerances are added. So, the control carried out using the gauge leaves no room for interpretation when the diagnostic is effected.

Furthermore, especially when the guiding device is obtained through cutting out from a plate, this imprint can easily be positioned either to be centered in relation to the support, or to be moved laterally in relation to the said support, and so adjusted easily depending on the longitudinal profile of each profile to be controlled.

According to a first advantageous embodiment, the upper imprint of the guiding devices can be made up of a generally "U"-shaped recess having an axis of symmetry extending into a plane oriented to an angle between 0° and 90° in relation to the vertical plane of the support.

In addition, advantageously according to a first embodiment of the invention, the upper imprint of the guiding devices can include at least one spur protruding in the said imprint, to give this imprint a retentive shape, ensuring locking, inside of the latter, of profiles which are made from a material that is able to provide elastic deformations of the said profiles.

According to a second advantageous embodiment of the invention, the upper imprint of the guiding devices can also include a right dihedron forming two perpendicular sides of reference for the positioning of the straight section of the profile T.

Therefore it can be concluded from this process that a multitude of shapes of guiding devices according to the invention can be made, in particular by changing the following parameters: the number and shape of the imprints, vertical positioning (offset) of these imprints, and the orientation of the said imprints.

Moreover, in another advantageous embodiment according to the invention, each brace has at least one spur protruding in the vertical slot of the said brace, in the upper part of the said slot, adapted to be housed in a recess made on each support.

Such spurs assure the perpendicularity of the braces in relation to the base plate and to the associated support, whatever the height of the said braces. Furthermore, securing spurs in their recess is a reversible procedure due the small dimensions of the said spurs which allow penetration the latter into their recess by elastic distortion of the brace. Due to this, such spurs have no effect on the dismantling and re-assembly of the gauge.

In another advantageous embodiment according to the invention, each brace has an asymmetrical shape relative to the axis of the vertical slot of the corresponding support. Such asymmetry helps, in effect, to facilitate the management of any bulkiness problems of the braces, while ensuring very good stability for the said braces.

Moreover, to increase this stability, advantageously according to the invention, each brace includes two tenons divided between one side and the other of the axis of the vertical slot of the said brace.

Still aiming to ensure perfect stability of the elements of the gauge, and advantageously according to the invention, each support and each brace has a straight bottom edge suitable to rest on the base plate.

In addition, advantageously according to the invention, the bottom edge of each support and of each brace has a notch at the level of each one of its junctions to a tenon, so as to eliminate any risk of defect in the flatness of the said bottom edge.

In another advantageous embodiment according to the invention, the base comprises a support plate obtained by cutting out from a sheet, and a foot base made up of a rim, obtained by cutting out, in the previously mentioned sheet, a strip from around the edge of the support plate, and spacers to join the said support plate and the said rim.

Such a foot base makes it possible to have light gauges which are less bulky, whilst at the same time having very good rigidity resulting from the fact that this foot forms a closed contour.

Therefore, the gauge according to the invention as described above allows:

to easily and economically produce a very accurate control gauge;

to assemble and dismantle the supports and braces very rapidly without tooling;

to ensure an accurate and repeated re-assembly of these same supports and braces onto the support plate;

to ensure a rapid and repeatable assembly of the grooved guiding devices on the supports, avoiding a control of the gauge after each assembly;

a storage in a minimal space;

an economical and rapid production not only in terms of labour but also in terms of material cost; and to obtain a light and easy to handle gauge.

BRIEF DESCRIPTION OF THE SEVERAL VIEWS OF THE DRAWINGS

Other characteristics, aims, and advantages of the invention will be apparent from the following detailed description with reference to annexed drawings which represent, as non-restrictive examples, a preferred embodiment of gauge according to the invention, as well as variations of the constituent elements of this gauge.

DETAILED DESCRIPTION OF THE INVENTION

Figure 1:
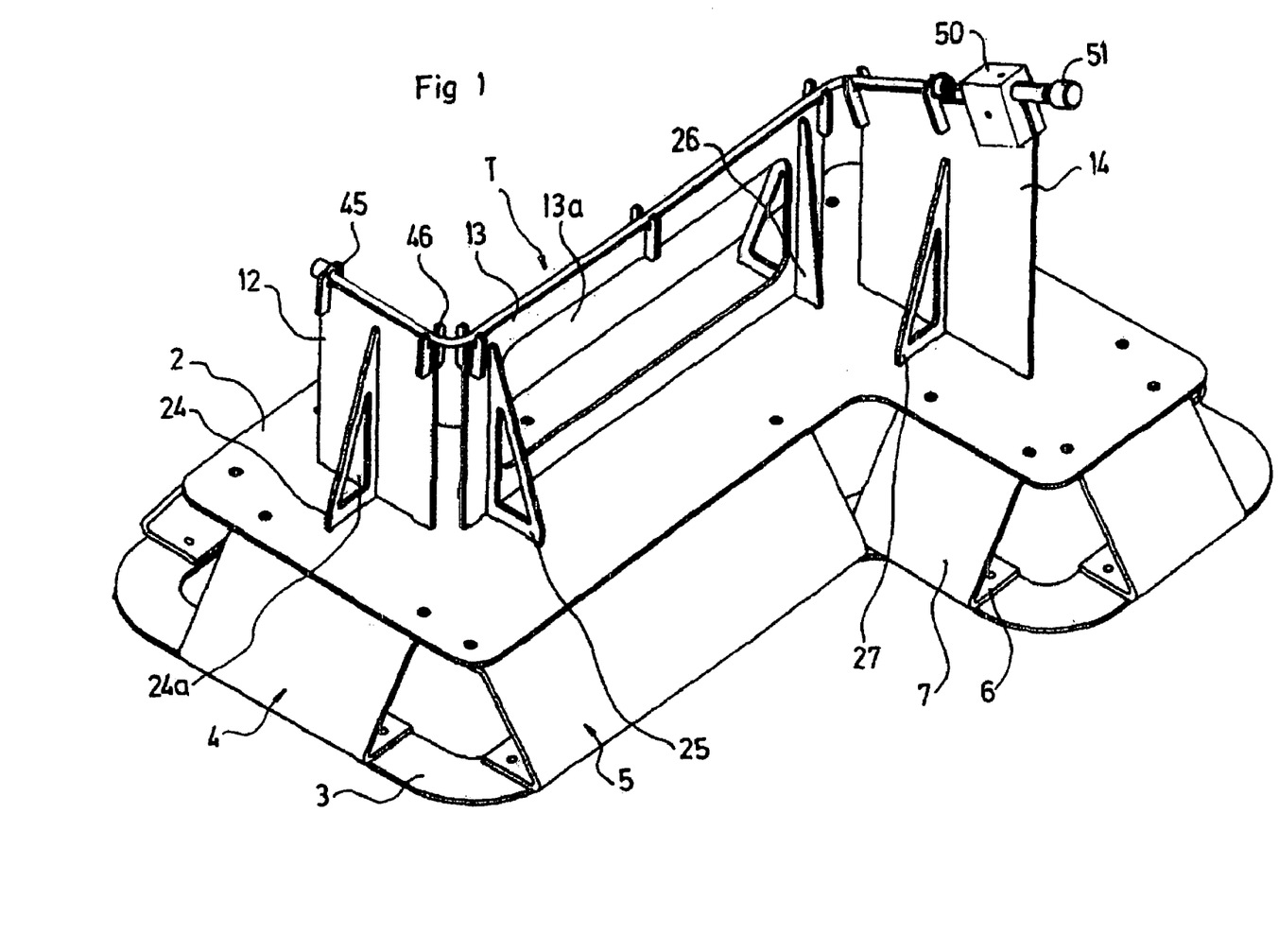
FIG. 1 is a perspective view of the gauge according to the invention and of the tubing able to be controlled by this gauge.

The demountable gauge according to the invention represented as an example in FIG. 1 is intended to control shaped profiles and bent tubings, and is usually made up of a superstructure defining the imprint of the profile to control, stabilized on a support base.

In accordance with the example represented in FIG. 1, this control gauge is adapted to ensure the control for tubes T, such as the one which is also represented in FIG. 1, which includes three straight sections linked together by bent sections.

In accordance with the invention, this gauge includes a support base as well as a number of single elements, supports and braces, obtained by cutting out from an aluminum plate a few millimeters thick, on which the said support base, supports, and braces are traced out.

First, the support base of this gauge includes a support plate 2 in a flat form "homothetic" with the horizontal projection of the profile T, in order to present minimal bulk.

This support base comprises, in addition, a foot support made up of ring-shaped strip 3 obtained by cutting out around the perimeter of the support plate 2, and spacers such as 4, 5 having an oblique linking wing 7 between the said support plate and the ring-shaped strip, and horizontal fixing wings such as 6 on these two elements.

Figure 2:
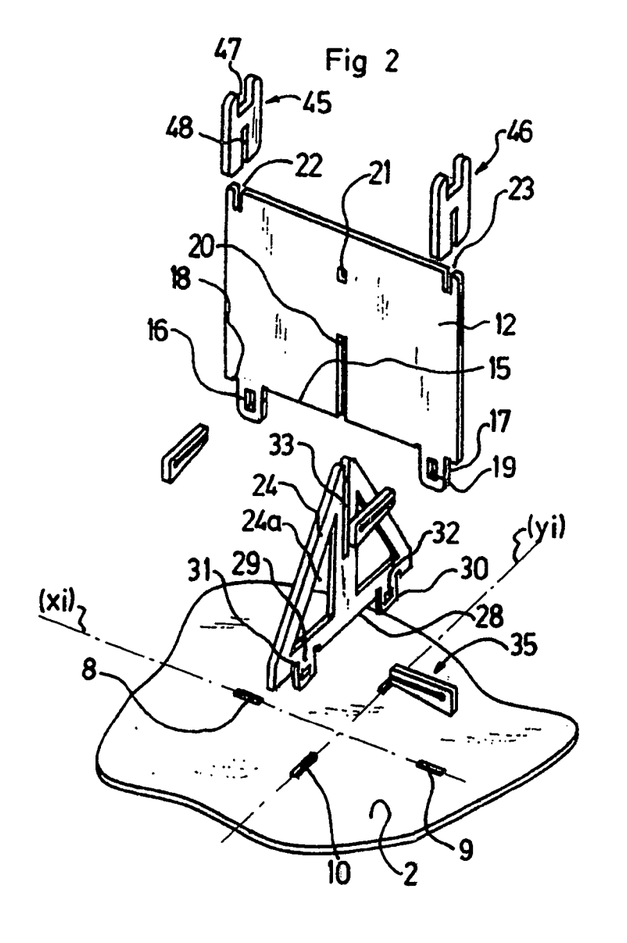
FIG. 2 is a partial exploded perspective view of a part of this gauge dedicated to guiding a straight profile section.

The support plate 2 is, moreover, bored with slots consisting of cut-out rectangular rest section holes in the said support plate, intended to position and fix the supports and braces. These slots are set out depending on the configuration of the tube T to be controlled. These slots include, for each straight section of said tube, and such as represented in particular in FIG. 2:

for the purpose of securing the support, two slots 8, 9 made in a way to extend in the direction of the horizontal line (xi) parallel to the orthogonal projection of the said straight section, each one respectively at the level of one of the end parts of the said straight section (it is also to be noted that one or several intermediate slots can be made if the length of the straight section justifies it); and for the purpose of securing each brace, two slots such as 10 made in a way to extend in the direction of an axis (yi) perpendicular to the axis (xi), symmetrically on either side of the said axis (xi).

Secondly, as mentioned above, the gauge in accordance with the invention has a superstructure made up of:

a number of individual supports equal to the number of straight sections of the profile to be controlled, and consequently, for the profile T three supports 12-14; and for each of the supports 12-14, and depending on the length of the latter, at least one brace; for the profile T, and as represented in FIG. 1, the two supports 12, 14, for positioning of the two straight end sections of the profile T, are each associated to a single brace 24, 27 placed halfway along these, due to their relatively short length. On the other hand, the support 13 for positioning the long straight intermediate section of the profile T, is associated to two braces 25, 26 each placed close to one of the ends of the said support.

Each of the supports 12-14 consists of a flat plate obtained by cutting out, presenting a right-angled trapezoidal shape defined by a bottom horizontal edge 15 adapted to rest on the support plate 2, and a straight upper edge forming, in relation to the horizontal, an angle function of the angle formed by the straight section of the profile T positioned on the said support.

Furthermore, it is to be noted that in order to optimize the weight of the gauge, the supports, as in the example the support 13, can include a hollow central part 13a.

Each of the supports 12-14 also includes at least two tenons 16, 17 from the same piece as the said support, and shaped when the latter is cut out. These tenons 16, 17 are spread along the extension of the bottom edge 15 of the supports 12-14, close to each of the ends of the said supports. Moreover, one or several intermediate tenons can be set out on the length of the supports 12-14 if the said length justifies it.

Furthermore, the bottom edge 15 of each support 12-14 presents a notch 18 at the level of each of its junctions with a tenon 16, 17, in order to prevent any flatness defect of said bottom edge.

Each tenon 16, 17, has, moreover, a length which is greater than the thickness of the support plate 2, so as to have a lower section projected on the underside of the support plate, into which is provided a hole 19 for the insertion of a detachable fixing element 35 to secure the support 12-14 with no play on the support plate 2.

Figure 5:
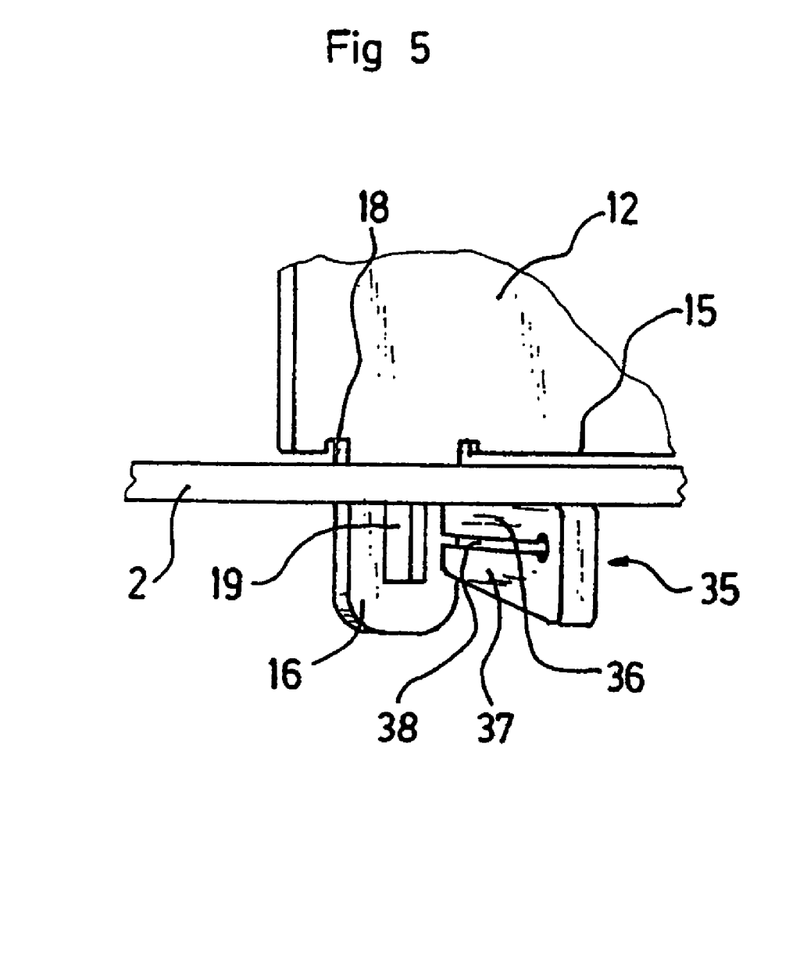
FIG. 5 is a frontal view representing the detachable fixing means to fix a gauge support according to the invention on the support plate of this gauge.

In the example represented in FIGS. 2 and 5, this fixing element consists of a quoin-shaped elastic wedge 35 made for example by cutting out of one plate, made of two longitudinal arms 36,37 separated by a longitudinal space 38, having a spring quality which tends to distance both of the said arms.

Each support 12-14 has, moreover, for each brace 24-27 connected to the latter, a notch 20 forming a vertical slot extending from the bottom edge 15 of the said support, almost halfway up this latter.

In addition, an aperture 21 is provided in each support 1214, above the vertical slot 20, in alignment with the vertical axis of this latter.

Each brace 24-27 is also formed from the flat plate obtained by cutting out, and has a generally triangular shape which is made up of a median upright delimiting two right-angled triangular parts, symmetrical or asymmetrical, possibly including a central hollow such as 24a.

The base of these braces 24-27 form, moreover, a bottom straight edge 28 adapted to rest on the support plate 2, on the extension of which are spread out two tenons 29,30 identical to those of the supports 12-14, and thus bored with a hole 32 for the insertion of a detachable fixing element 35. Exactly the same as the supports 12-14, the bottom edge 28 of each brace 24-27 also has, moreover, a notch 31 at the level of its junction with a tenon 29, 30.

Each brace 24-27 includes a vertical slot 33 made from the top of the said brace, almost halfway down this latter. Furthermore, two spurs such as 34 are made opposite each other, protruding into this slot 33, so as to secure in a reversible way in the aperture 21 of the associated support 12-14.

Based on this principle, each support 12-14 and each brace 24-27 has a vertical slot, respectively 20, 33 positioned so as to obtain a mutual fitting of each of the said elements, support and brace, in the vertical slot 20, 33 of the other, in a fitted in position where the said support and brace extend perpendicularly.

Moreover, each support 12-14 is provided with guiding devices having an imprint adapted to house the straight section of the tube T assigned to this support.

Figure 3:
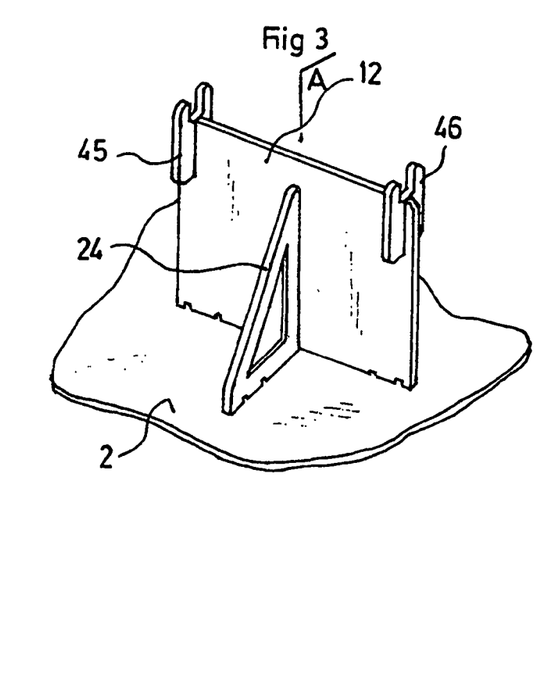
FIG. 3 is a perspective view of this part of the gauge in its assembled state.
Figure 4:
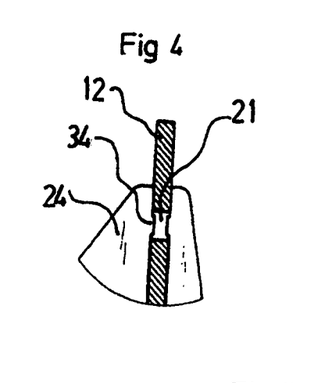
FIG. 4 is a partial sectional view through the vertical plane A of FIG. 3 representing the upper zone of this part of the gauge.

With reference to the example represented in FIGS. 2 and 3, these guiding devices consist of bridges such as 45, 46 made by cutting out from one plate, in order to present an H-shape having:

- a bottom part 48 adapted to be fit with no play into a vertical notch such as 22, 23 provided in the upper edge of the support 12-14; and
- an upper part 47 forming a recess whose dimensions are adapted to house, with a control tolerance, the tube T.

Based on this principle of 'bridge', a great variety of shapes of guiding devices can be made by modifying principally the following parameters: the number and shape of the imprints, the vertical positioning (offset) of these imprints, and orientation of the said imprints.

FIGS. 8 to 15 represent, as non-restrictive examples, several models of guiding parts able to be made in accordance with this principle of bridge, each including a bottom part having a vertical notch 57 (FIG. 8) or 86 (FIGS. 9 to 15), adapted to fit with no play onto a support 12-14.

Figure 8:
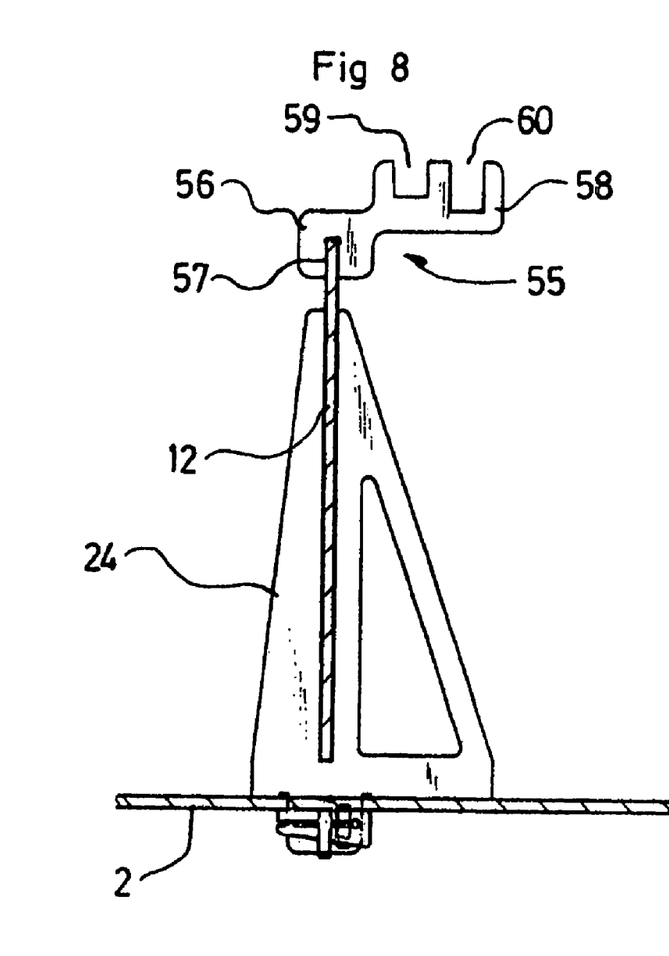
FIG. 8 is a vertical sectional view of a gauge support according to the invention fitted with a second variant of the guiding devices.

FIG. 8 represents a guiding part 55 with a lower fitting part 56 on the upper edge of a support 12, and an upper part 58 moved laterally in relation to lower part 56, into which are put two juxtaposed imprints consisting of two recesses 58, 59 in the shape of a U extending at different height levels.

Figure 9:
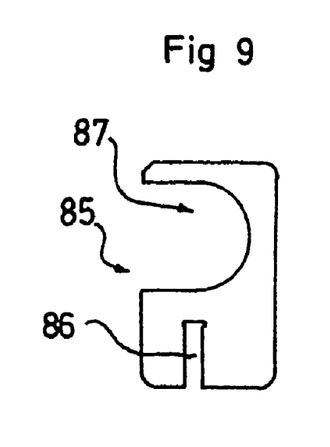
FIGS. 9 to 15 are frontal views of seven other variants of the guiding devices for a gauge according to the invention.

FIG. 9 represents a guiding part 85 whose imprint 87 is made up of a recess in the shape of a U oriented so that its axis of symmetry extends horizontally.

Figure 10:
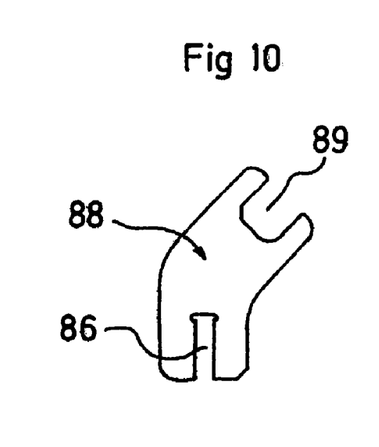

FIG. 10 represents a guiding part 88 whose imprint 89 is made up of a recess in the shape of a U oriented so that its axis of symmetry is inclined at an angle of 45°.

Figure 11:
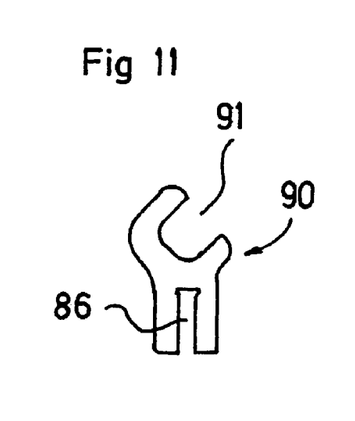

FIG. 11 represents a guiding part 90 whose imprint 91 is made up of a recess in the shape of a U moved horizontally in relation to the one in FIG. 10, but oriented, as the latter, so that its axis of symmetry is inclined at an angle of 45°.

Figure 12:
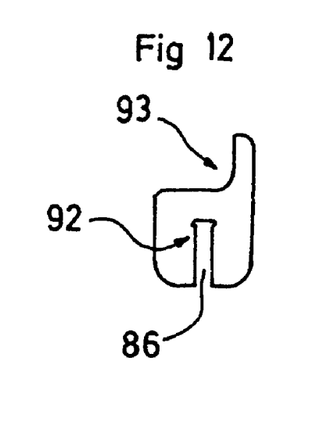

FIG. 12 represents a guiding part 92 whose imprint 93 consists of a right dihedron forming two perpendicular reference sides for positioning of the straight section of the profile T, these reference sides including an horizontal side centered on the vertical plane of the support.

Figure 13:
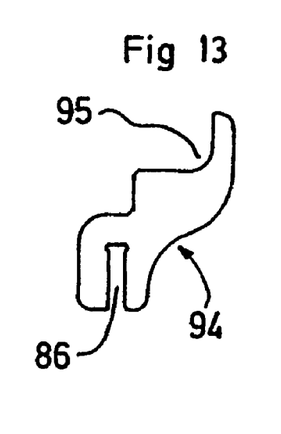

FIG. 13 represents a guiding part 94 whose imprint 95 consists of a right dihedron forming two perpendicular reference sides for positioning of the straight section of the profile T, these reference sides including an horizontal side moved laterally in relation to the vertical plane of the support.

Figures 14, 15:
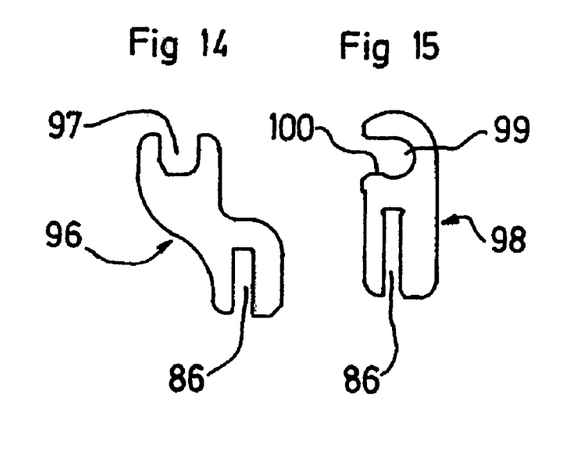

FIG. 14 represents a guiding part 96 whose imprint 97 is made up of a recess in the shape of a U oriented so that its axis of symmetry extends vertically, and positioned in a way that the said axis of symmetry is moved laterally in relation to the vertical plane of the support.

FIG. 15 represents the guiding part 98 similar to that of FIG. 9, but whose imprint 99 includes two spurs 100 protruding in the said imprint, so as to confer a retentive shape to this latter.

Figure 7:
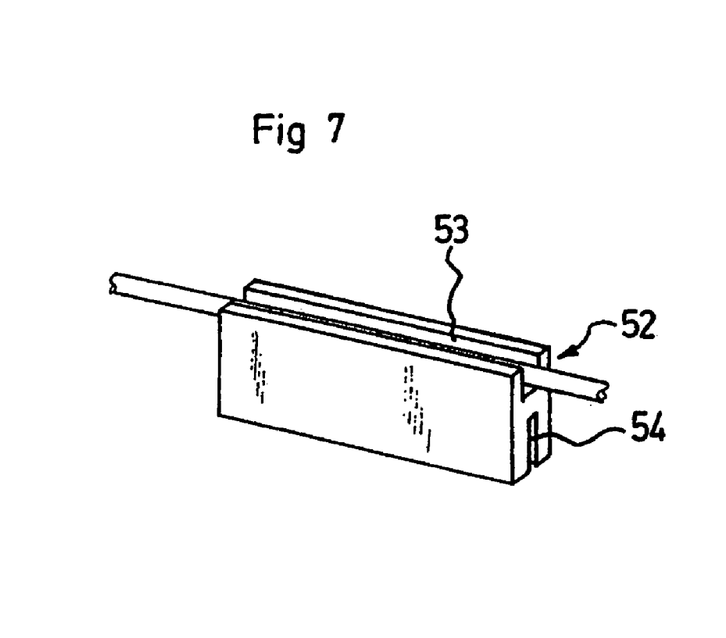
FIG. 7 is a perspective view of a first variant of the guiding devices according to the invention.

FIG. 7 represents a design variant of a guiding part likely to fit to a support 12-14 in accordance with the invention.

With this figure, the guiding part is shaped from a bar 52 machined on its whole length in a way to present an H-shape section having a bottom groove 54 adapted to cover the support with no play, and an upper groove 52 of the section adapted to insert the profile.

Figure 16:
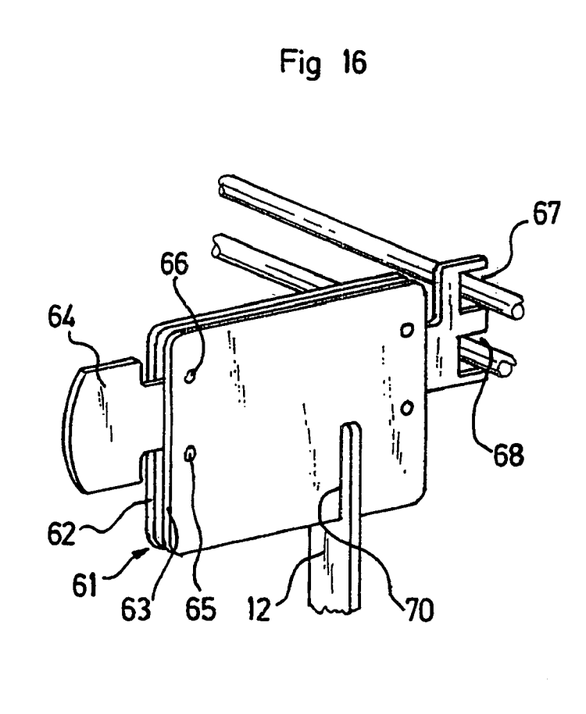
FIG. 16 is a perspective view of another variant of the guiding devices of a gauge according to the invention.

FIG. 16 represents a guiding element of a particular design, whose property is that it can retract horizontally so that the profile to be checked can be inserted and be withdrawn.

This guiding element includes a fixed part 61 made up of two vertical plates 62,63 held parallel away from each other by means of pins such as 65,66 set out in a way to define, between the two plates, a horizontal corridor able to house a sliding part 64 made up of a mobile guiding part.

According to the example represented, the two plates 62, 63 have, moreover, facing each other, a vertical notch 70 to adjust fixed part 61 on the support 12.

As for the mobile part 64, it includes two superimposed imprints 67,68 each forming a recess horizontally oriented.

The gauge in accordance with the invention can also include, such as in FIG. 1, a known type indexing device 50 which includes a rod 51, positioned on one of the end supports 14 of the superstructure and intended to control the end of the tube T.

Figure 6:
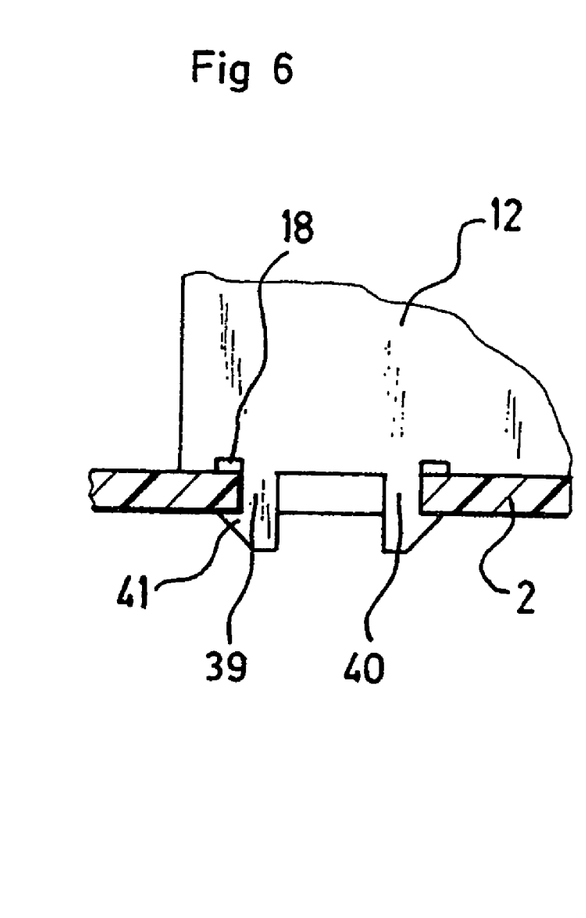
FIG. 6 is a partial frontal cross section view representing a first variant of fixing means to fix a gauge support according to the invention onto the support plate of this gauge.

FIG. 6 represents a variant of support 12 having a tenon with a shape adapted to lock onto the support plate 2 without requiring any detachable fixing element.

In this respect, this tenon has a notch shape made with two clip tabs 39,40 having a hook 41 able to lock into the underside of the support plate 2, the said clip tabs being flexibly deformable between an apart natural locking position and a close unlocking position.

Figure 17:
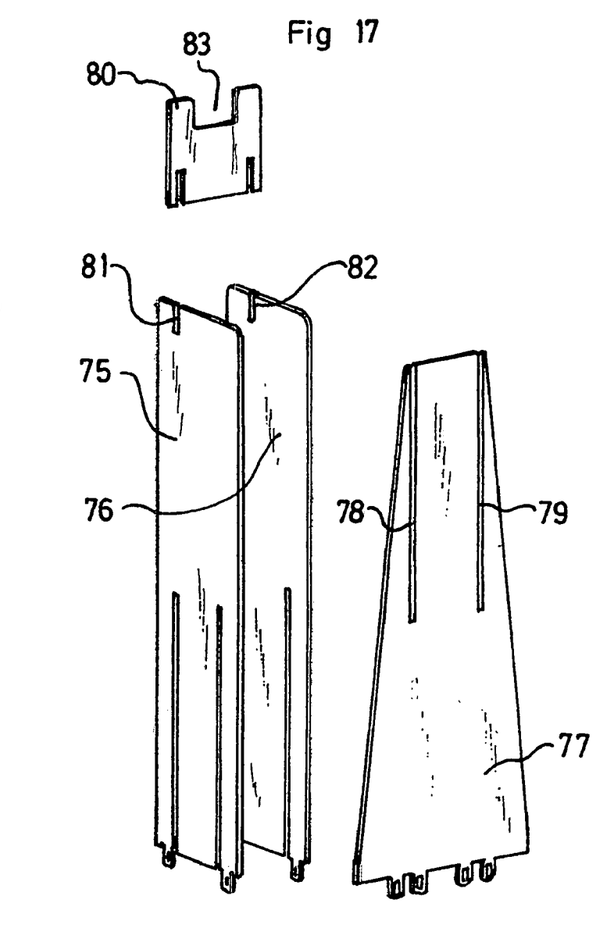
FIG. 17 is an exploded perspective view of a variant of a complete unit support/braces/guiding devices of a gauge according to the invention.

FIG. 17 represents a version particularly adapted to making very high supports.

With this version, each support is <<doubled up>>, i.e. made up of two identical supports 75,76 adapted to be positioned in parallel on the support plate 2, and to be <<spaced>> by means of a single brace 77 having two vertical slots 78,79 able to allow fitting the said brace to the two supports 75,76.

With this method of assembly, the guiding part 80 is also unique and adapted to be adjusted in two notches 81, 82 each placed in one of the supports 75, 76. In addition, and in the example, this guiding part 80 has a unique imprint 83 made up of a recess.

I claim:

1. A gauge device for controlling a geometry of a shaped or bent profile having straight and bent sections, the gauge device comprising:
   - a base having a support plate, said support plate having a plurality of holes formed therein;
   - a superstructure defining an imprint of the profile, said plurality of holes comprising first holes extending in a direction of lines parallel to orthogonal projections of the straight section of the profile and at least one second hole extending in a direction perpendicular to the orthogonal projection of the straight section, said superstructure comprising:

a support having a flat plate, said flat plate having tenons adjustably fitted into said first holes, said support having an upper section fitted with a guiding device for the straight section; and at least one brace having a flat plate, said flat plate of the brace having at least one tenon adjustably fitted into said at least one second hole, said support and the brace each having a notch defining a vertical slot extending from a bottom portion of the support and an upper portion of the brace, the vertical slots allowing said support and the brace to be mutually fitted together such that said support and the brace extend perpendicularly each of said tenons of said support and the brace having a length that is longer than a thickness of said support plate such that said tenons jut outwardly of said support plate, each of said tenons having a notch fit so as to rigidly position said support and the brace without play on said support plate.

2. The gauge device of claim 1, further comprising:
a detachable fixing element received in said notch of said tenons.

3. The gauge device of claim 1, each of said tenons comprising a pair of tabs, said pair of tabs defining the notch, at least one of said pair of tabs being a clip tab having a surface locked onto an underside of said support plate, said pair of tabs being flexible so as to move between a locking position to an unlocking position.

4. The gauge device of claim 1, said guiding device having a bottom groove fitted onto a top of said support.

5. The gauge device of claim 1, said guiding device having an upper imprint having a shape suitable for receiving the straight section of the profile, said upper imprint being centered on a vertical plane of said support.

6. The gauge device of claim 5, said upper imprint being a U-shaped recess having an axis of symmetry extending into a plane oriented at an angle of between 0° and 90° relative to said vertical plane of said support.

7. The gauge device of claim 6, said upper imprint of said guiding device having at least one spur protruding into said upper imprint.

8. The gauge device of claim 5, said upper imprint being a right dihedron defining a pair of perpendicular sides.

9. The gauge device of claim 1, the brace having at least one spur protruding into an upper part of said vertical slot of said brace, the spur housed in a recess of said support.

10. The gauge device of claim 1, the brace having an asymmetrical shape relative to an axis of said vertical slot of said support.

11. The gauge device of claim 1, wherein the at least one tenon of the brace comprises two lenons divided between both sides of the axis of the vertical slot of the brace.

12. The gauge device of claim 1, each of said support and the brace having a straight bottom edge resting on an upper surface of said support plate.

13. The gauge device of claim 12, said straight bottom edge having a notch formed therein adjacent to the tenon.

14. The gauge device of claim 1, said base having a foot having a rim, said base having a spacer joining said support plate to said rim.

* * * * *